(12) United States Patent
Thomas et al.

(10) Patent No.: US 11,546,883 B2
(45) Date of Patent: Jan. 3, 2023

(54) METHOD AND DEVICE FOR RESOURCE SELECTION IN NR V2X

(71) Applicant: LG Electronics Inc., Seoul (KR)

(72) Inventors: Robin Thomas, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/665,304

(22) Filed: Feb. 4, 2022

(65) Prior Publication Data

US 2022/0159627 A1  May 19, 2022

Related U.S. Application Data

(63) Continuation of application No. PCT/KR2020/010302, filed on Aug. 5, 2020.

(30) Foreign Application Priority Data

Aug. 5, 2019 (KR) .................. 10-2019-0095120

(51) Int. Cl.
*H04W 72/02* (2009.01)
*H04W 72/08* (2009.01)
*H04W 72/04* (2009.01)
*H04W 52/08* (2009.01)
*H04W 36/00* (2009.01)
(Continued)

(52) U.S. Cl.
CPC .......... *H04W 72/02* (2013.01); *H04L 1/1812* (2013.01); *H04W 36/00837* (2018.08); *H04W 36/08* (2013.01); *H04W 52/08* (2013.01); *H04W 72/0446* (2013.01); *H04W 72/085* (2013.01)

(58) Field of Classification Search
CPC ............ H04W 72/02; H04W 72/0446; H04W 72/085; H04W 36/00837; H04W 36/08; H04L 1/1812
See application file for complete search history.

(56) References Cited

U.S. PATENT DOCUMENTS

2017/0347394 A1   11/2017  Yasukawa et al.
2021/0377912 A1*  12/2021  El Hamss ............. H04L 1/1819

FOREIGN PATENT DOCUMENTS

| EP | 3211950 | 8/2017 | |
|---|---|---|---|
| KR | 20210061845 A * | 5/2021 | ............ H04W 92/18 |
| WO | WO 2018080151 | 5/2018 | |

(Continued)

OTHER PUBLICATIONS

U.S. Appl. No. 62/787,991 of US2021/0377912A1, filed Jan. 3, 2019. (Year: 2019).*

(Continued)

*Primary Examiner* — Melvin C Marcelo
(74) *Attorney, Agent, or Firm* — Fish & Richardson P.C.

(57) ABSTRACT

Provided herein is a method for performing, by a first apparatus (100), resource selection in a wireless communication system. The method may include the steps of receiving system information including configuration information related to exceptional pools from a base station (200); selecting the first exceptional pool or the second exceptional pool, based on at least one of a physical layer problem, a connection re-establishment, a handover, or a normal resource pool which is unavailable; selecting a resource from the selected exceptional pool; and performing a sidelink (SL) communication using the resource.

10 Claims, 22 Drawing Sheets

(51) Int. Cl.
*H04W 36/08* (2009.01)
*H04L 1/18* (2006.01)

(56) References Cited

FOREIGN PATENT DOCUMENTS

| WO | WO2019022470 | | 1/2019 | | |
|---|---|---|---|---|---|
| WO | WO-2020198317 | A1 * | 10/2020 | ............ | H04W 72/12 |
| WO | WO-2021025446 | A1 * | 2/2021 | ............ | H04L 5/006 |
| WO | WO-2021026887 | A1 * | 2/2021 | ............ | H04W 48/12 |
| WO | WO-2021040223 | A1 * | 3/2021 | | |

OTHER PUBLICATIONS

3GPP TR 37.985 V0.1.0 (Aug. 2019) 3rd Generation Partnership Project; Technical Specification Group Radio Access Network; Overall description of Radio Access Network (RAN) aspects for Vehicle-to-everything (V2X) based on LTE and NR (Release 16), pp. 1-20. (Year: 2019).*

Huawei, HiSilicon, "Discussion on HARQ feedback enable and disable," R2-1907416, 3GPP TSG RAN WG2 #106, Reno, USA, May 13-17, 2019, 9 pages.
LG Electronics, Inc., "NR Sidelink design based on LTE Sidelink," R2-1815441, 3GPP TSG RAN WG2 #103bis, Chengdu, China, Oct. 8-12, 2018, 8 pages.
MediaTek Inc., "Usage of exceptional pool," R2-1906816, 3GPP TSG RAN WG2 #016, Reno, USA, May 13-17, 2019, 5 pages.
Vivo, "On the need of exceptional pool in NR V2X," R2-1905852, 3GPP TSG-RAN WG2 #106, Reno, USA, May 13-17, 2019, 7 pages.
Extended European Search Report in European Application No. 20850987.7, dated Jul. 15, 2022, 14 pages.
Huawei et al., "Discussion on HARQ support for NR sidelink," 3GPP TSG-RAN WG2 #106, R2-1907414 (Revision of R2-1904879), Reno, USA, May 13-17, 2019, 6 pages.
Huawei et al., "Mobility enhancements for mode-1 and mode-2," 3GPP TSG-RAN WG2 Meeting 105, R2-1902045, Athens, Greece, Feb. 25-Mar. 1, 2019, 5 pages.
Samsung, "Discussion about exceptional pool for resource pool sharing between UEs using mode 3 and UEs using mode 4," 3GPP TSG-RAN WG2 Meeting #100, R2-1712846 (Resubmission of R2-1711733), Reno, Nevada, Nov. 27-Dec. 1, 2017, 2 pages.

* cited by examiner

FIG. 4
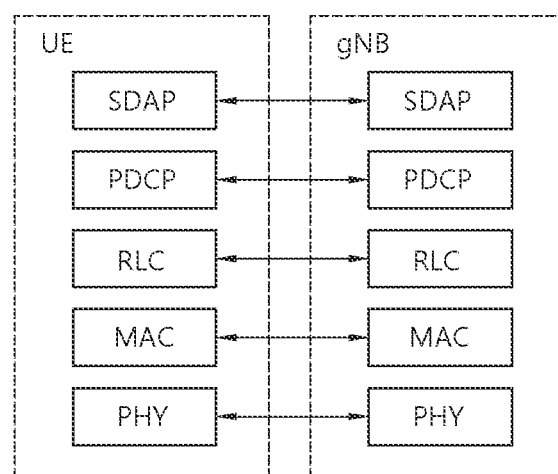
(a)
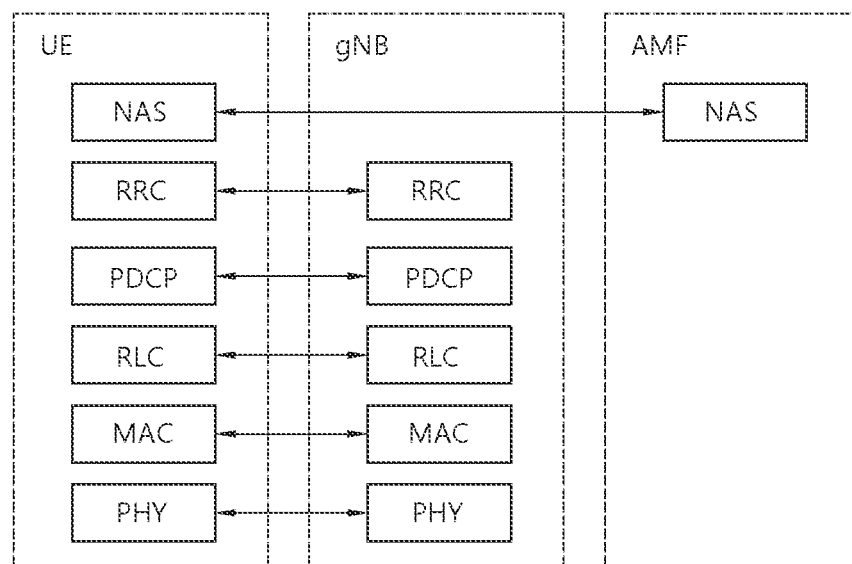
(b)

FIG. 8
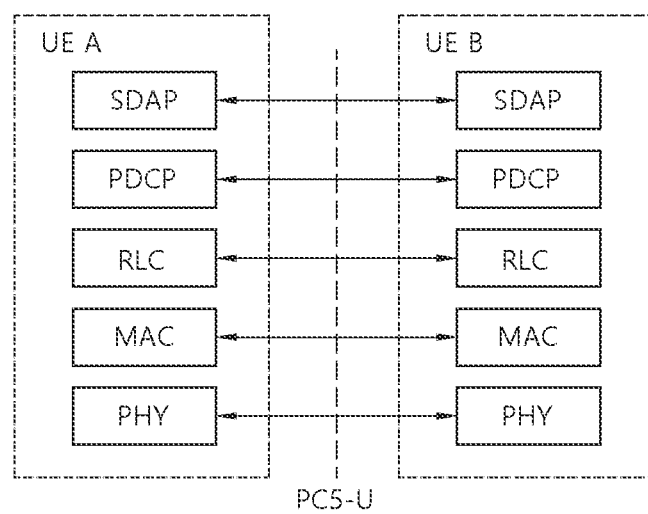
(a)
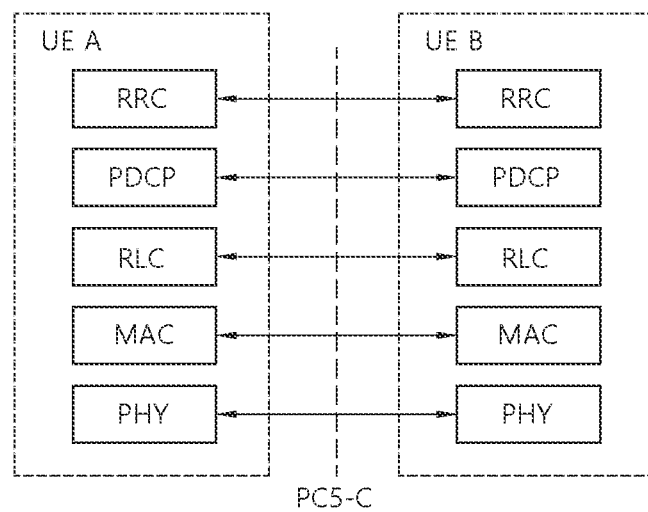
(b)

FIG. 16 transmitting system information including
configuration information related          — S1610
to exceptional pools to a first apparatus

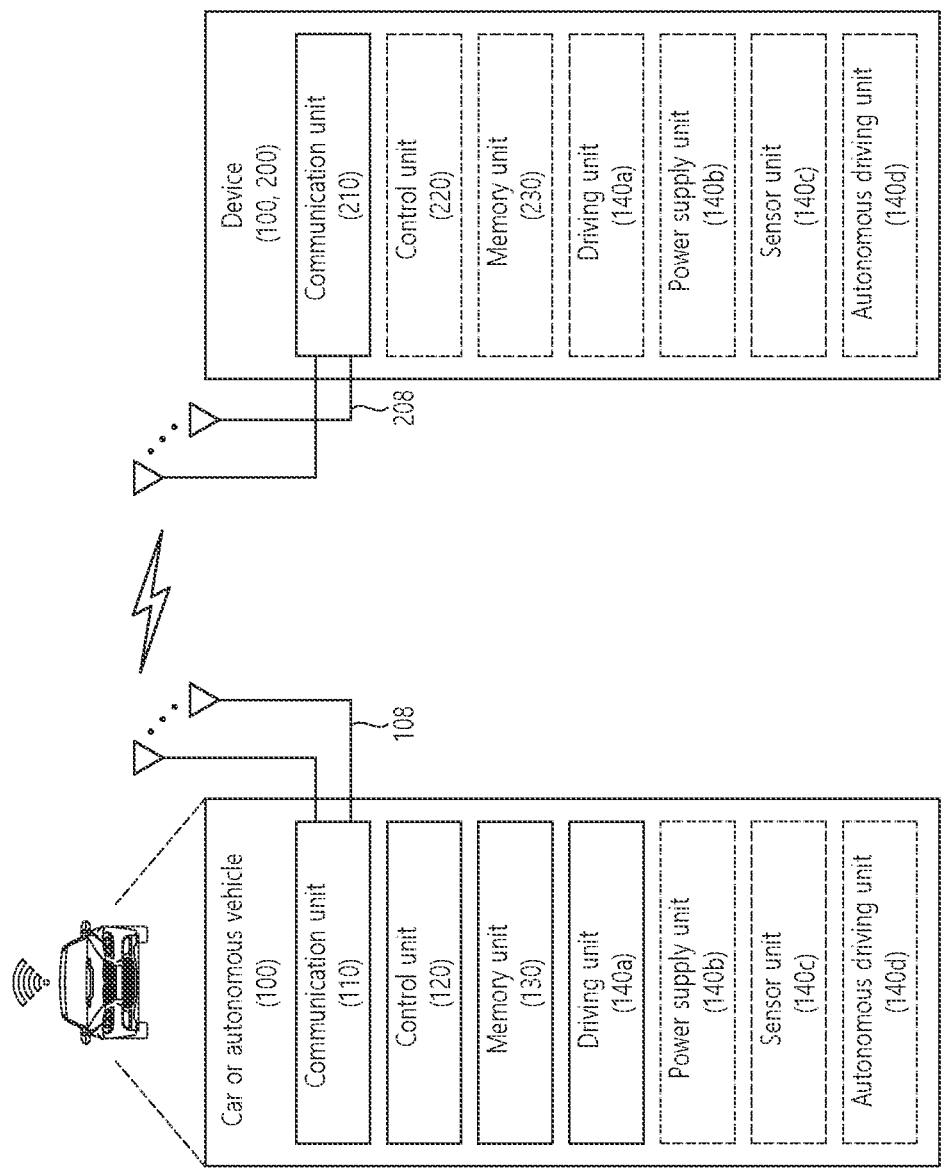

METHOD AND DEVICE FOR RESOURCE SELECTION IN NR V2X

CROSS-REFERENCE TO RELATED APPLICATIONS

Pursuant to 35 U.S.C. § 119(e), this application is a continuation of International Application PCT/KR2020/010302, with an international filing date of Aug. 5, 2020, which claims the benefit of Korean Patent Application No. 10-2019-0095120, filed on Aug. 5, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solution

According to an embodiment, provided herein is a method for performing, by a first apparatus (100), resource selection in a wireless communication system. The method may include the steps of receiving system information including configuration information related to exceptional pools from a base station (200); selecting the first exceptional pool or the second exceptional pool, based on at least one of a physical layer problem, a connection re-establishment, a handover, or a normal resource pool which is unavailable;

selecting a resource from the selected exceptional pool; and performing a sidelink (SL) communication using the resource.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 16 shows a procedure of configuring exceptional pools by a base station.

FIG. 22 shows a car or an autonomous vehicle, in accordance with an embodiment of the present disclosure.

DESCRIPTION OF EXEMPLARY EMBODIMENTS

Figure 1:
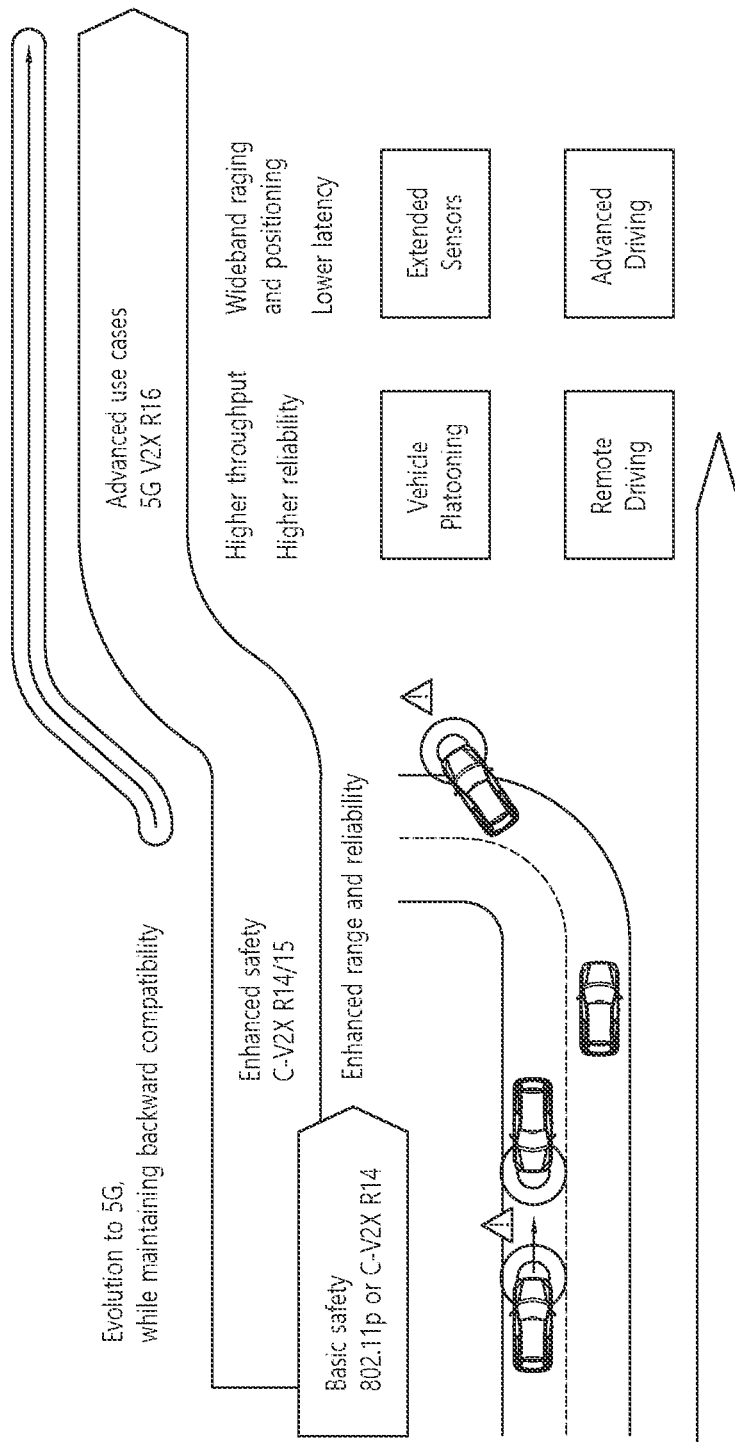
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C"

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C"

In the present specification, "at least one of A and B" may mean "only A", "only B", or "both A and B". In addition, in the present specification, the expression "at least one of A or B" or "at least one of A and/or B" may be interpreted as "at least one of A and B"

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C"

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information"

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
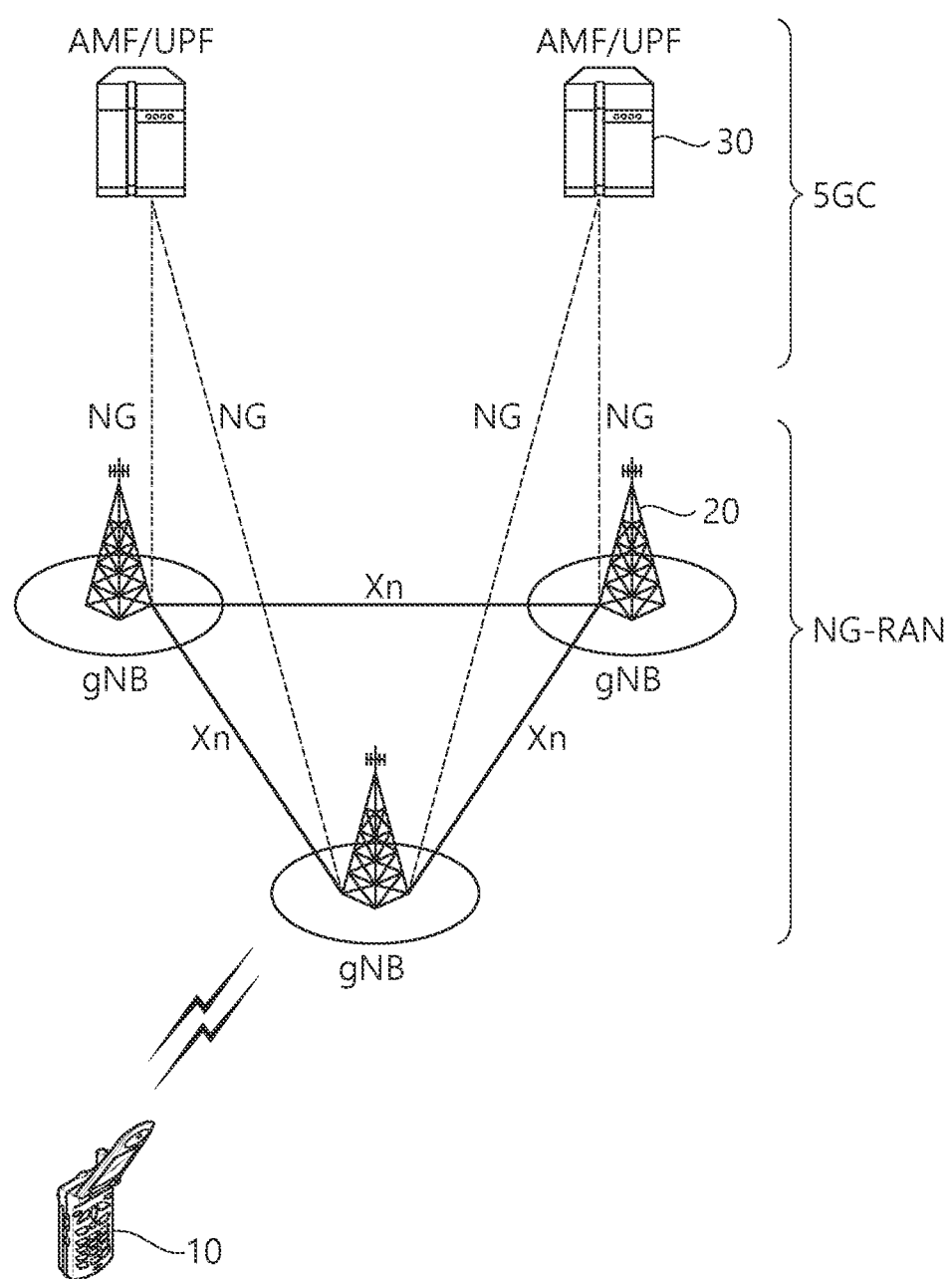
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
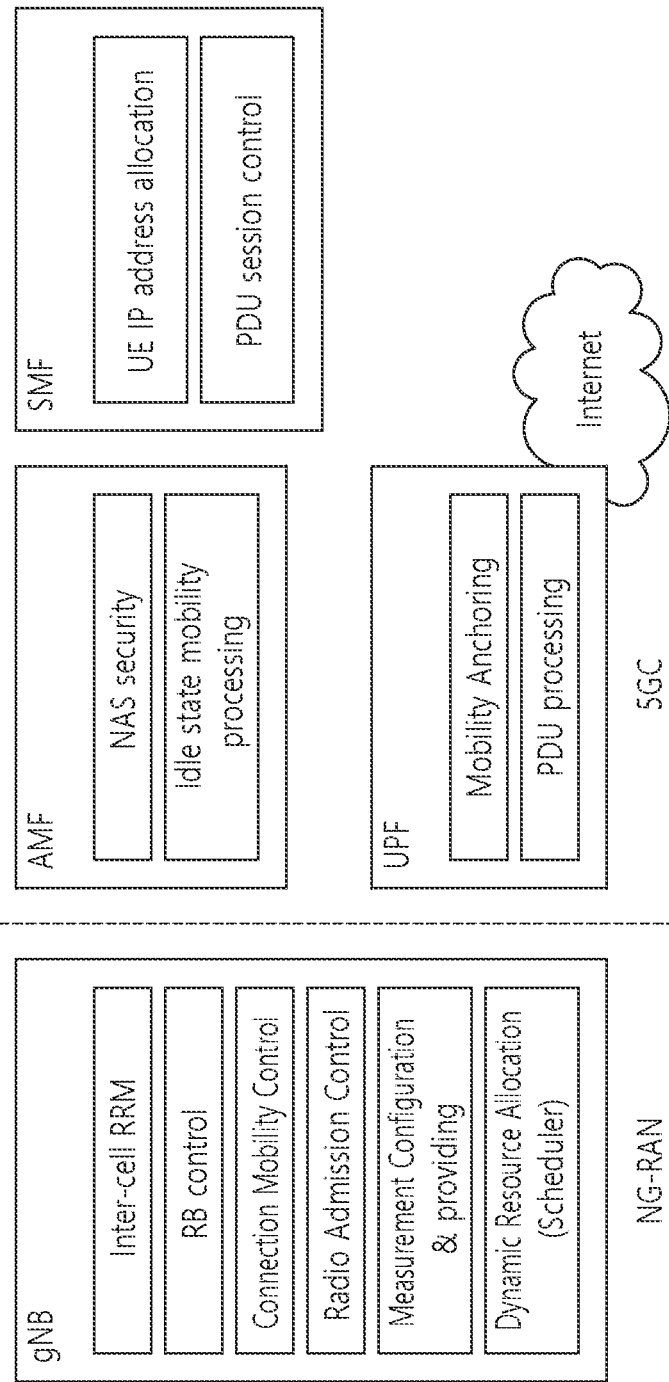
FIG. 3 shows a functional division between an NG-RAN and a SGC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink- SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
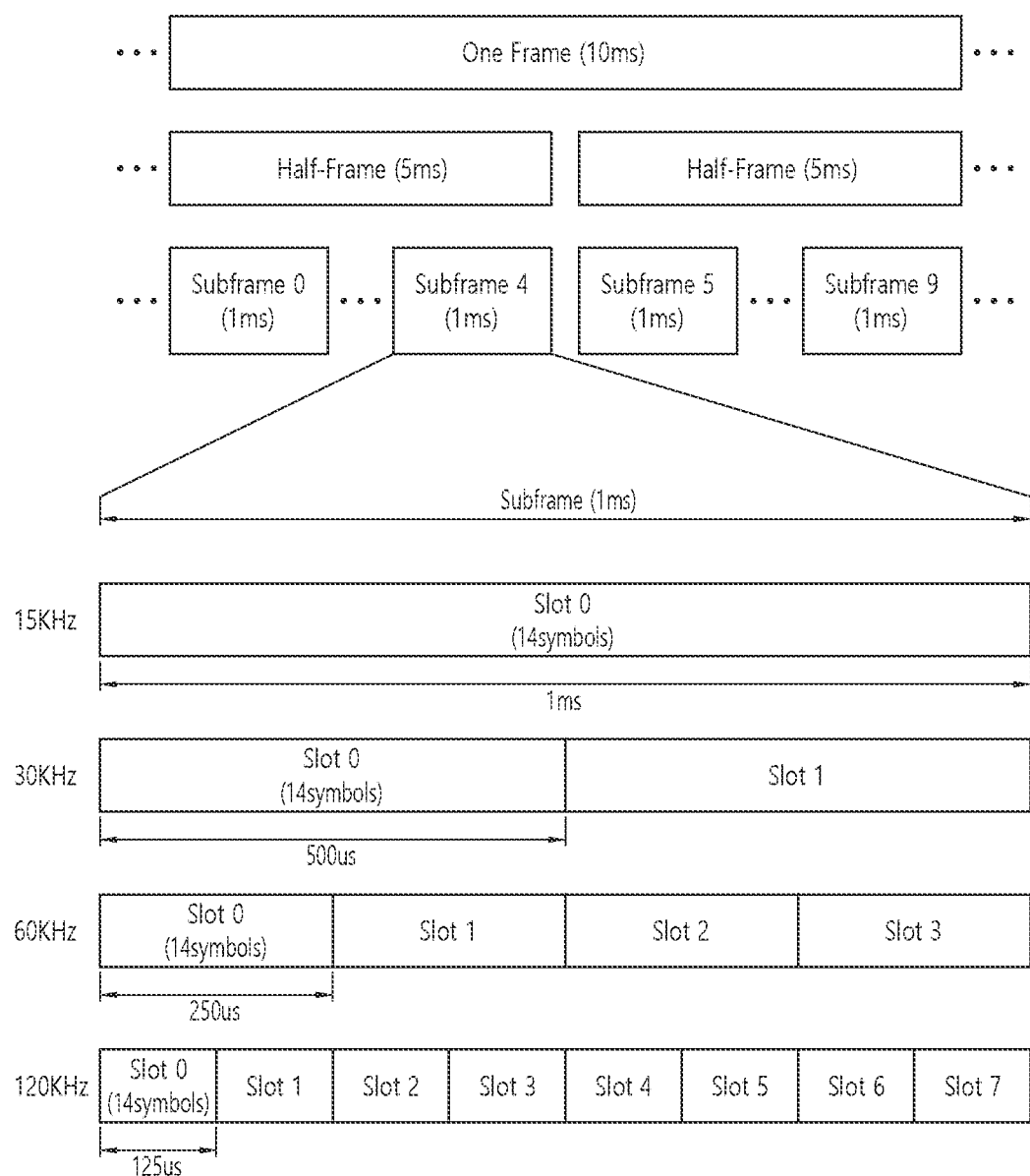
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
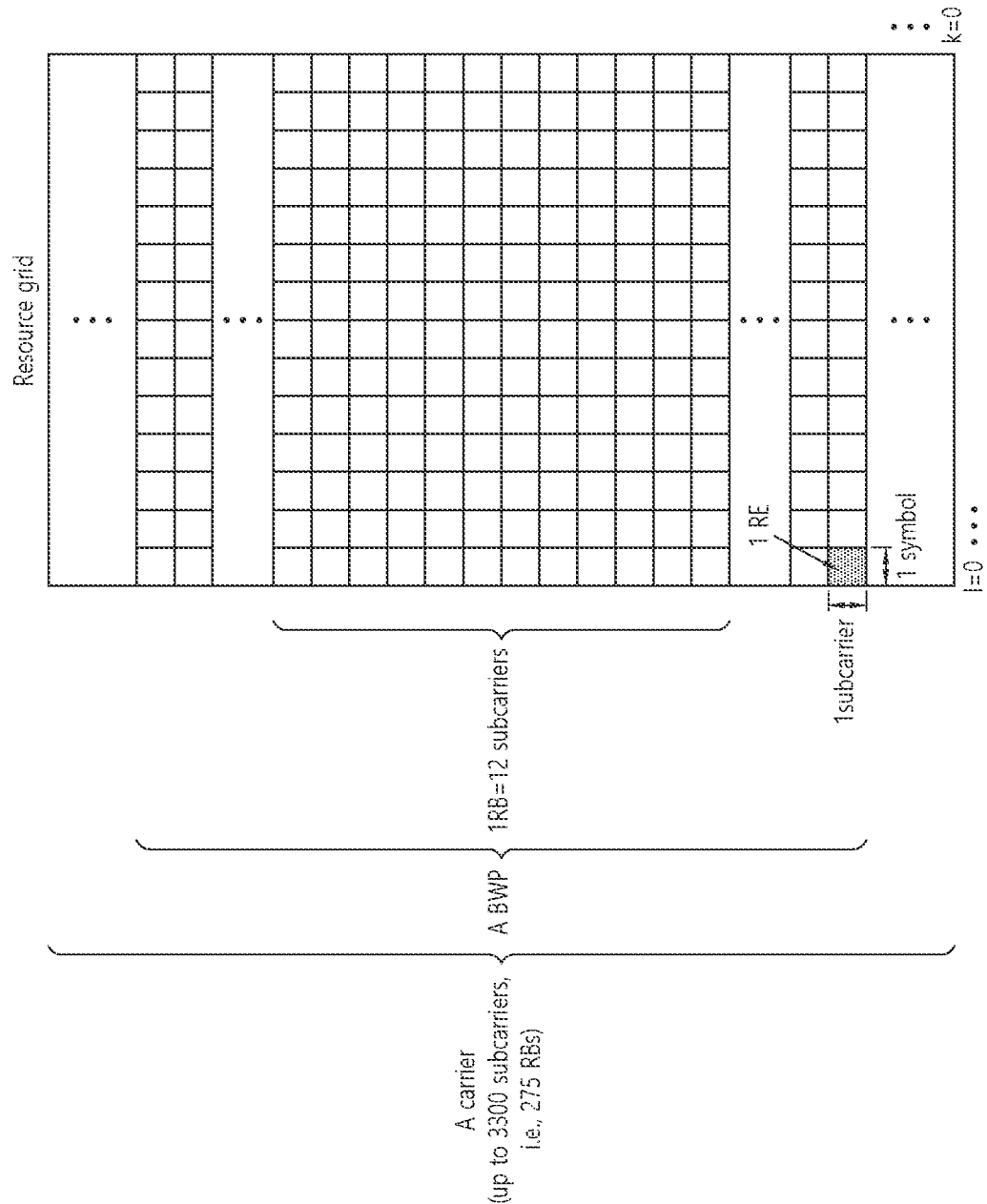
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
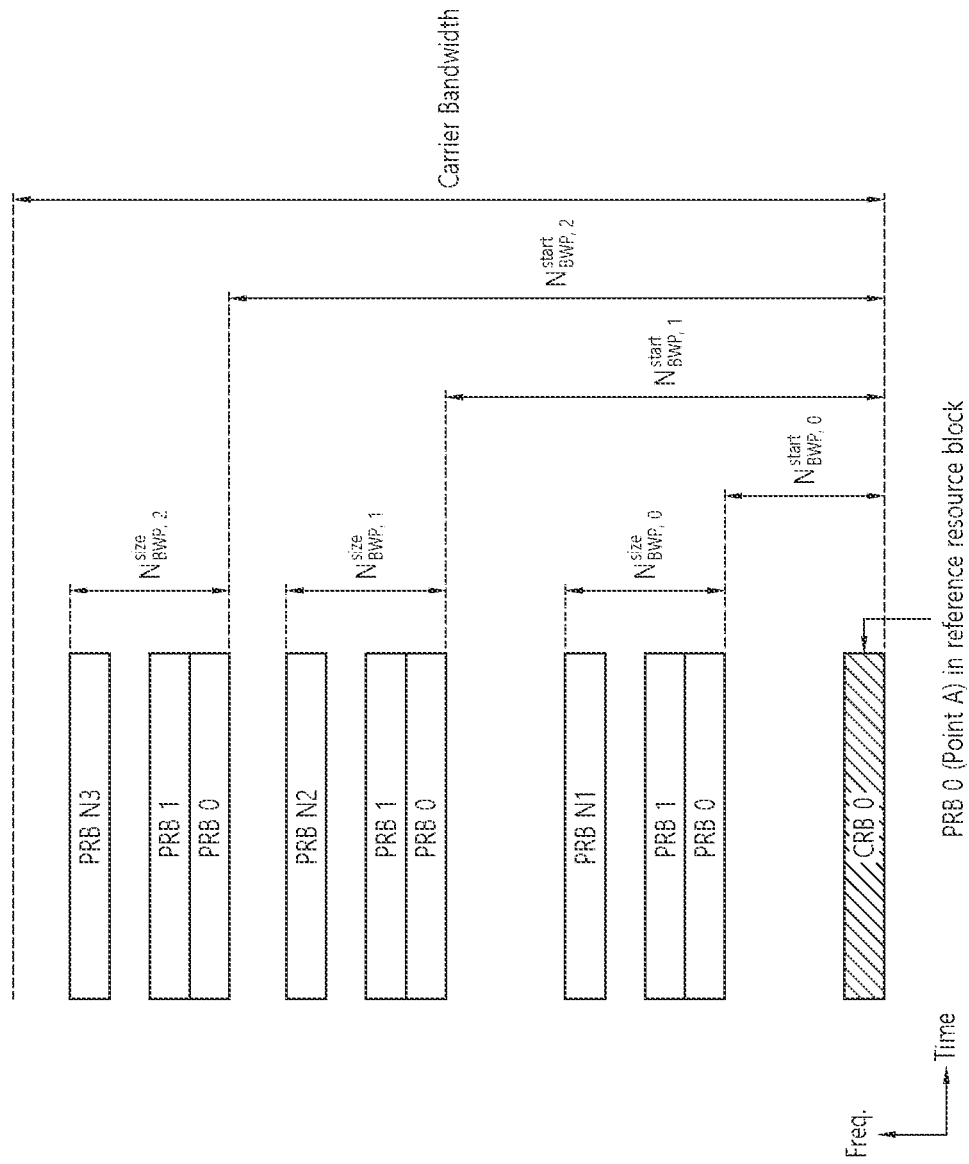
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
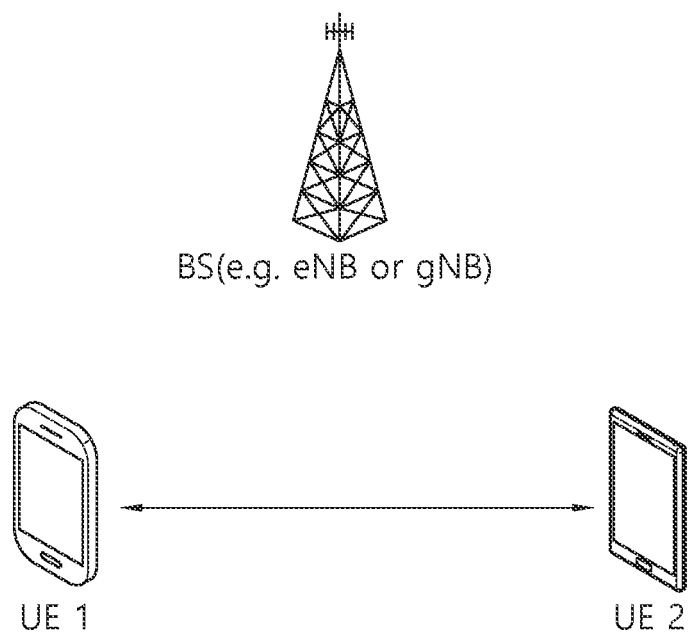
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
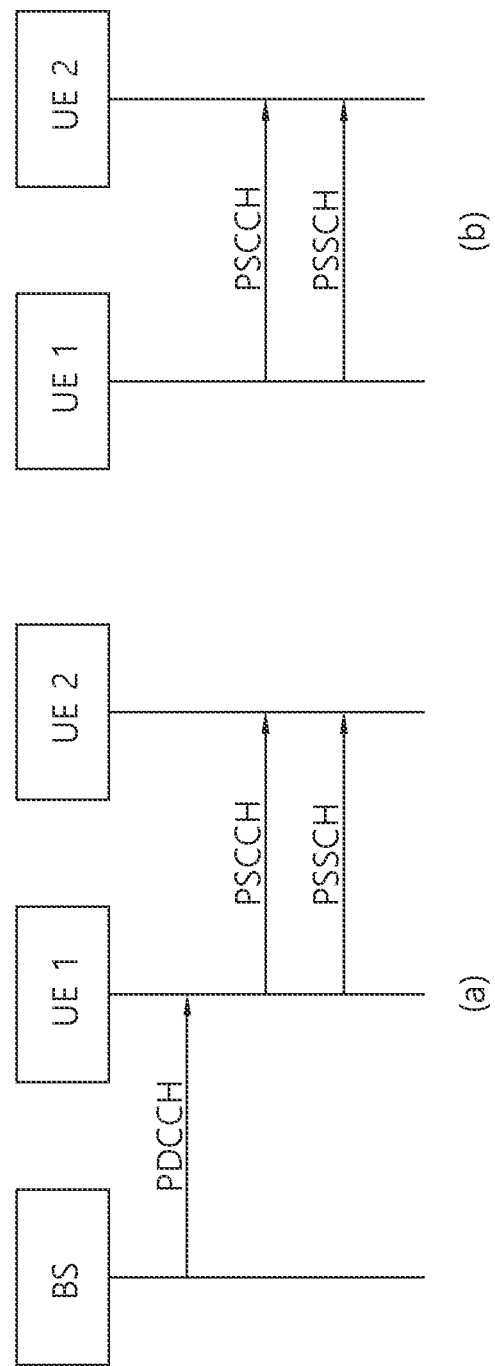
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
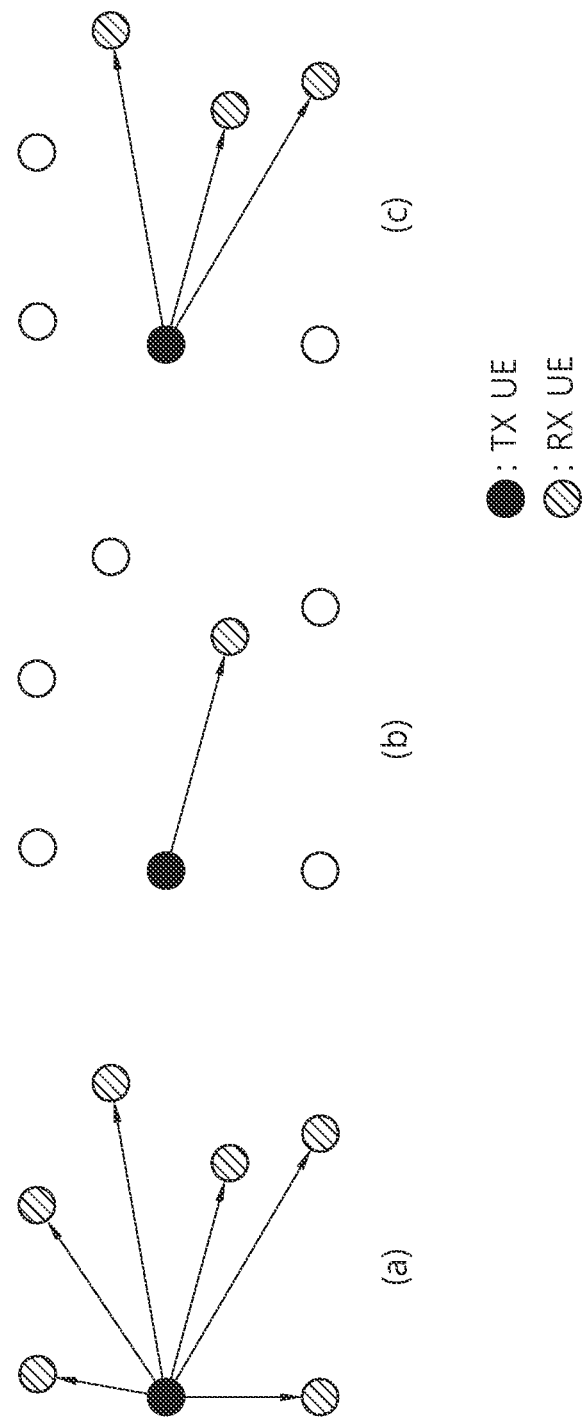
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

The exceptional transmit (TX) pool is a set of time-frequency resources used for sidelink communication in particular exceptional scenarios. For example, in LTE V2X, the exceptional TX pool, was used in the following instances: upon detection of any physical layer problems such as Radio Link Failure (RLF), upon near completion of initiated connection (re)establishment, during a handover, and when the sensing results of the normal TX pool are unavailable.

For example, NR V2X introduces advanced use cases which require higher reliability and lower latency sidelink communications. Additional events are also proposed to be considered: cell reselections and a beam failure/reselection.

In the prior art, it has been agreed that the LTE V2X concept of the exceptional pool may be adopted to NR V2X. However, LTE served the basic requirements of broadcast safety V2X services and therefore certain enhancements would be deemed necessary to account for the stringent QoS requirements of the advanced use cases. Alternative solutions exist where the exceptional TX pool can be separated according to cast type, which can increase reliability, but may result in lower resource efficiency.

For example, UE physical layer transmission parameters may be also adapted in order to ensure reliable and stable link performance in different radio channel conditions. Such adaptations may also assist in satisfying the stringent QoS requirements. Open-loop and closed-loop power control mechanisms are exemplary physical layer parameters, which can be used to optimize the transmitter's power in relation to the receiver.

For example, open-loop power control is a mechanism whereby the transmitter determines its own transmit power based on a set of parameters. For example, closed-loop power control refers to the mechanism where the receiver dynamically controls the transmitter power, (e.g. when UE transmit power is controlled by the BS via the transmission power control command (TPC)).

As a result, it is possible to adapt the UE transmission power based on the information sent in a particular channel, e.g. PRACH, PUCCH, PUSCH.

The following Math Figure 1 may describe the UE closed-loop power control in the PUSCH in NR.

$$P_{PUSCH} = \min\{P_{CMAX}, P_0(j) + \alpha(j) \cdot PL(q) + 10 \cdot \log_{10}(2^\mu \cdot M_{RB}) + \Delta_{TF} + \delta(l)\}$$ [Math Figure 1]

Referring to the Math Figure 1, $P_{CMAX}$ may refer to the maximum power allocated per carrier. $P_0(j)$ may define the target receiver power configured by the network. $\alpha_0(j)$ may be the fractional pathloss component configured by the network. PL(q) may refer to the estimate on the uplink pathloss. $\mu$ may be the subcarrier spacing where $\Delta f = 2^\mu \cdot 15$ kHz. $M_{RB}$ may a number of resource blocks for PUSCH transmission. $\Delta_{TF}$ may refer to the modulation scheme and channel coding rate. $\delta(l)$ may be the power adjustment due to closed-loop power control. These parameters are a function of the power control mechanism. Similar mechanisms may also be used along the sidelink (SL).

Targets the disclosure aims to address will be described below. For example, the targets may include ensuring higher reliable SL communications to satisfy the stringent NR V2X requirements, and enhancing the performance of the exceptional resource pool for SL communications, especially in scenarios where the resource pool is experiencing a high traffic load. Such high traffic loads in the resource pool may be caused by multiple UEs performing different cast type sidelink communications (i.e. broadcast, groupcast and unicast) and depending on the QoS of each these V2X services, this may cause performance degradation in terms of reliability.

The following description aims to address the aforementioned issue related to the enhancement of the exceptional pool.

Referring to an example of this disclosure, a method of resource selection wherein a UE is allowed to select at least one exceptional Tx pool from a set of exceptional pools may be proposed. For example, a base station (e.g. gNB) may configure the set of exceptional pools in system information. The set of exceptional pools may be differentiated according to the occupancy or QoS fulfillment criteria. For example, in the context of QoS, there may be a set of exceptional pools, which may contain at least one exceptional pool with allocation of feedback resources (ensure higher reliability for SL transmissions) and at least one exceptional pool without feedback resources (with no reliability requirements). For example, examples of feedback may include but not limited to HARQ feedback, channel state information (CSI), closed-loop power control parameters.

For example, the base station may configure such exceptional resource pools based on a validity area where system information related to this resource pool may be valid. For example, the validity area can comprise of a single or multiple sidelink zone(s), a sector, a single beam or a set of beams, a set of cells, e.g. source cell and target cell. For example, the selected exceptional pool may use a resource selection mechanism that includes random resource selection or short-term sensing resource selection. The resource selection mechanism may be selected or determined based on the following considerations: On the QoS (PQI/VQI) of the associated V2X packet or QoS flow. Or, the reported resource occupancy (e.g. CBR) of the exceptional pool.

For example, here, short-term sensing is an operation to perform additional sensing for a predetermined time (a period from the selection of a transmission resource until a signal is transmitted) after selection of a transmission resource, and to discard the selected transmission resource and select another resource when a possibility of collision is detected.

Referring to an example of this disclosure, a method where a UE may select an exceptional pool with higher reliability (e.g. allocation of feedback resources) upon prior explicit or implicit indication as follows may be proposed. For example, explicit (direct) indication may include a procedure that a UE may signal an indication to the Base Station (BS) regarding its need for an exceptional resource pool with higher reliability (allocation of feedback resources). This may be performed prior to the actual utilization of the exceptional resource pool. For example, implicit indication may include a procedure that if a UE is previously using a Mode 1 resource pool with a capability of providing feedback, then the UE may be entitled to maintain the same configuration and use an exceptional pool with feedback resources to maintain reliable service continuity.

Referring to an example of this disclosure, a method wherein a UE can be simultaneously configured with an exceptional pool from two Radio Access Technologies (RATs), e.g. an exceptional pool from an LTE system information configuration and an exceptional pool from an NR system information configuration may be proposed. For example, the UE may also be simultaneously configured with an NR exceptional pool from an LTE RAT and an NR RAT. For example, the UE may also be simultaneously configured with an LTE exceptional pool from an LTE RAT and an NR exceptional pool from an NR RAT.

Referring to an example of this disclosure, a method wherein a UE can request the exceptional pool configuration using RRC signaling may be proposed.

Referring to an example of this disclosure, a method wherein a UE may measure and report the resource occupancy of at least one exceptional pool using e.g. channel busy ratio (CBR), time and frequency indices, etc may be proposed.

Referring to an example of this disclosure, a method wherein a UE selects a specific transmission (Tx) profile for operation in an exceptional pool may be proposed.

Referring to an example of this disclosure, a UE may normally select the configured exceptional pool from the stored system information (e.g. SIB21), in the event of an exceptional event such as a physical layer radio link failure (RLF). A key aim of the resource pool may be to improve service continuity in the event of an emergency situation, which originated from the initial D2D use cases.

This description aims to enhance the exceptional pool configuration to a UE, in order to enhance the overall reliability and alleviate the resource burden that may occur by having an exceptional pool with high traffic.

Referring to an example of this disclosure, the BS (base station) configures the cell-specific or area-specific exceptional resource pool configuration, which includes a set of exceptional pools. For example, the exceptional pools may be divided based on the occupancy level or provided level of QoS, e.g. reliability requirements that may include resource pools that comprise of feedback resources or resource pools that are not allocated with feedback resources.

Figure 12:
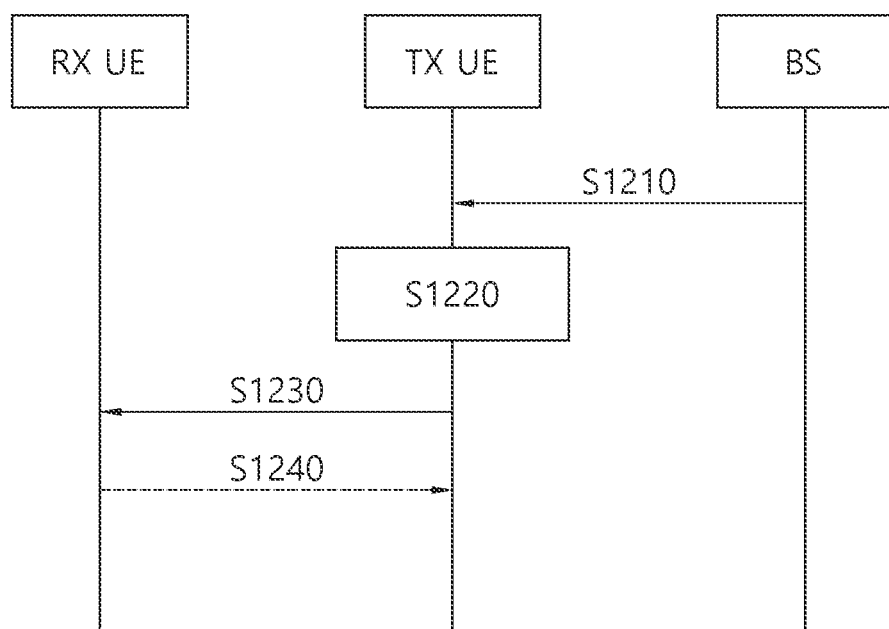
FIG. 12 shows a procedure of performing a SL communication by a TX UE.

FIG. 12 shows a procedure of performing a SL communication by a TX UE. The embodiment of FIG. 12 may be combined with various embodiments of the present disclosure.

Referring to FIG. 12, in step S1210, a base station may transmit configuration information related to exceptional pools to a TX UE. In step S1220, the TX UE may select an exceptional pool including a feedback resource or another exceptional pool not including the feedback resource, based on QoS of a packet to be transmitted. The selection may be triggered based on at least one of a physical layer problem, a connection re-establishment, a handover, or a normal resource pool which is unavailable. And the TX UE may select a resource from the selected exceptional pool. In step S1230, the TX UE may perform a SL communication with a RX UE using the resource. If the selected exceptional pool includes a feedback resource, in step S1240, the RX UE may transmit a feedback to the TX UE. The feedback may include at least one of HARQ feedback, channel state information (CSI), or closed-loop power control parameters.

For example, the UE may furthermore use random resource selection or short-term sensing and resource (re-)selection in the selected exceptional pool based on the QoS of the packet. Short-term sensing may be used for increased reliability relating to SL transmissions in the selected exceptional pool. For example, the UE may also determine the resource selection method to use, depending on the prior measured occupancy of the exceptional pool.

Referring to an example of this disclosure, specified QoS and occupancy criteria may have to enable the UE to select the required exceptional pool from the configured set of exceptional pools. This may result in certain UEs only using a particular exceptional pool due to its QoS service level requirements. For example, this may be in the form of direct signaling or an indirect indication.

For example, a direct signaling may be in the form of a single bit flag in the on-demand SI request related to the configuration of the type of exceptional pool. The single bit flag may differentiate between a request for a normal exceptional pool without feedback resources (0) or an exceptional pool with feedback resources (1).

For example, an indirect indication may be that if a BS is aware of ongoing SL communications using Mode 1, then it may preemptively signal the exceptional pool configuration with feedback resources in order to maintain reliable service continuity.

For example, the BS may signal the UE using a System Information (SI) update using dedicated signaling e.g. via an RRCReconfiguration message.

Referring to an example of this disclosure, a UE may be simultaneously configured with an exceptional pool from two Radio Access Technologies (RATs). This feature enables a UE to utilize a simultaneous cross-RAT exceptional pool configuration by allowing a UE to select between an LTE exceptional pool or an NR exceptional pool for SL transmission, depending on the QoS requirements. For example, a service in UE with higher QoS requirements will select the NR exceptional pool from the NR RAT as opposed to the LTE configured exceptional pool from the LTE RAT.

For example, the UE can be simultaneously configured with two exceptional pools as dictated by the V2X services in the upper layer and/or based on the QoS requirements. For example, if a UE is simultaneously configured to perform Mode 1 and Mode 2 transmissions, then in an exceptional event the UE can fallback to using the NR exceptional pool for the Mode 1 transmission and an LTE exceptional pool for a Mode 2 transmission.

Referring to an example of this disclosure, an on-demand SI request for a particular exceptional pool configuration may be made by a UE and transmitted to the BS. For example, an on-demand SI request for a highly reliable exceptional pool (e.g. an exceptional pool with feedback resources) may be an example. For example, this request can be sent pre-emptively, before the use of an exceptional pool.

Figure 13:
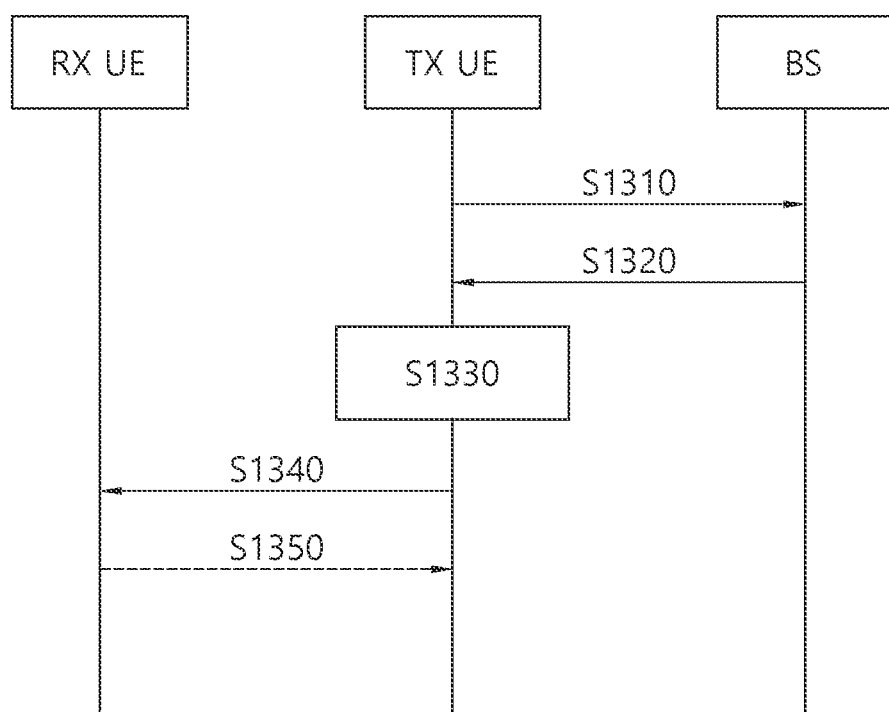
FIG. 13 shows a procedure of performing a SL communication by a TX UE.

FIG. 13 shows a procedure of performing a SL communication by a TX UE. The embodiment of FIG. 13 may be combined with various embodiments of the present disclosure.

Referring to FIG. 13, in step S1310, a TX UE may transmit a request related to an exceptional pool to a base station. In step S1320, the base station may transmit configuration information related to exceptional pools to the TX UE based on the request. In step S1330, the TX UE may select an exceptional pool including a feedback resource or another exceptional pool not including the feedback resource, based on QoS of a packet to be transmitted. The selection may be triggered based on at least one of a physical layer problem, a connection re-establishment, a handover, or a normal resource pool which is unavailable. And the TX UE may select a resource from the selected exceptional pool. In step S1340, the TX UE may perform a SL communication with a RX UE using the resource. If the selected exceptional pool includes a feedback resource, in step S1350, the RX UE may transmit a feedback to the TX UE. For example, the feedback may include at least one of HARQ feedback, channel state information (CSI), or closed-loop power control parameters.

Referring to an example of this disclosure, the UE may measure the resource occupancy of at least one exceptional pool or set of exceptional pools and report the occupancy status to the BS. For example, the report may be in the form of CBR value(s), or explicit free or used resources and its corresponding time and frequency location within the resource pool. For example, these measurements may take place periodically or be event-triggered.

Referring to an example of this disclosure, each application/service is mapped to a particular Tx profile in order to ensure compatibility, especially on the physical layer among different UEs. For example, there are more constraints in terms of resource availability and QoS guarantee of the exceptional pool, when compared to normal Tx pool operations. In this regard, an UE's service/application can be mapped to an exceptional Tx profile when using the exceptional pool as a fallback from a standard Tx profile operating on a normal Tx resource pool. The key motivation is that the exceptional pool may not fulfill all the requirements specified in the standard Tx profile of a UE and hence an alternative 'exceptional' Tx profile should be selected, which has adapted the relevant physical layer transmission parameters accordingly.

For example in the context of HARQ feedback, a standard TX profile may indicate the use of HARQ feedback in sidelink (SL) for a certain application/service, however it is not guaranteed that a specific exceptional pool enables SL HARQ feedback by allocating certain resources for HARQ feedback transmissions. In this case, when the UE falls back to the exceptional pool, HARQ feedback will be automatically disabled if the exceptional pool does not configure resources for HARQ feedback transmissions or provides a different configuration with a less frequent appearance of HARQ feedback resource making it difficult to meet the latency requirement. In that case, the UE should be able to adapt its transmission parameters accordingly in order to match the QoS of the standard Tx profile, in a best effort manner when disabling HARQ feedback.

For example, the physical link layer parameters in an exceptional Tx profile may be adapted when operating in an exceptional pool. For example, the physical link payer parameters may include increasing the amount of blind retransmissions. For example, the physical link payer parameters may include adopting a lower MCS, more generally using a different set of MCS. For example, the physical link payer parameters may include adopting a lower order MIMO transmission scheme, more generally using a different MIMO transmission scheme including a different minimum and/or maximum number of layers transmitted. For example, the physical link payer parameters may include disabling open- and/or closed-loop power control or using of a different power control parameter configuration (including the target received power P0, the pathloss compensation parameter alpha ($\alpha$)). For example, the physical link payer parameters may include disabling beam-based power control.

Referring to an example of this disclosure, a set of exceptional Tx profiles may be created, which cater to the different combinations of PHY layer link parameters. This would require Tx profile switching in the event that the exceptional pool is selected or in use. For example, the corresponding service/application shall also be notified when the Tx profile has changed.

Referring to an example of this disclosure, data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment).

In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 14:
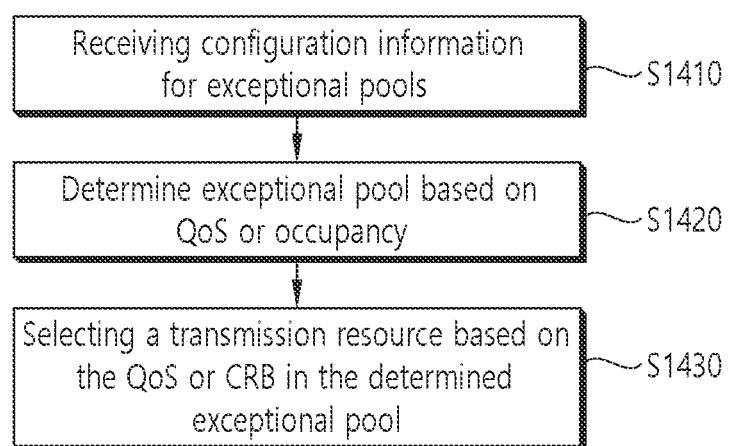
FIG. 14 shows a procedure of selecting a transmission resource by a UE.

FIG. 14 shows a procedure of selecting a transmission resource by a UE. The embodiment of FIG. 14 may be combined with various embodiments of the present disclosure.

FIG. 14 is a flowchart for explaining the operation of the UE (or VRU, V2X, RSU, etc.) related to the embodiments of the present disclosure described above. Referring to FIG. 14, in step S1410, the UE can receive configuration information for exceptional resource pools from the base station. The exceptional resource pools are set differently according to quality of service (QoS) or occupancy. Here, the use of an exceptional resource pool of the UE may be indicated implicitly or explicitly as indicated above. Next, in step S1420, the UE may select or determine a corresponding exceptional pool from among the exceptional pools based on the QoS or occupancy associated therewith. Next, in step S1430, the UE may determine a resource selection method based on QoS, QoS flow, or CBR for an exceptional pool. Here, the resource selection method may include the randomly resource selection method and/or a resource selection method based on short-term sensing. The UE may transmit the message on the selected transmission resource based on the determined resource selection method.

Referring to an example of this disclosure, a processor may implement the functions, processes, and/or methods suggested herein. The processor controls the transceiver to receive configuration information on exceptional resource pools from the base station. The exceptional resource pools are set differently according to quality of service (QoS) or occupancy. Here, the use of an exceptional resource pool of the UE may be indicated implicitly or explicitly as indicated above. Next, the processor may select or determine a corresponding exceptional pool among the exceptional pools based on the QoS or occupancy associated therewith. Next, the processor may determine a resource selection method based on QoS, QoS flow, or CBR for an exceptional pool. Here, the resource selection method may include the randomly resource selection method and/or a resource selection method based on short-term sensing. The processor may control the transceiver to transmit a message on the selected transmission resource based on the determined resource selection method.

For example, the selection of more than one exceptional Tx pool enables greater flexibility when dealing with exceptional radio events of different UEs with varying QoS requirements. For example, the exceptional pool with allocation of feedback resources also allows UEs to perform more reliable sidelink communications in such exceptional scenarios. For example, the exceptional Tx profile enables the system to adapt the relevant physical layer parameters to the usage of the exceptional pool.

Figure 15:
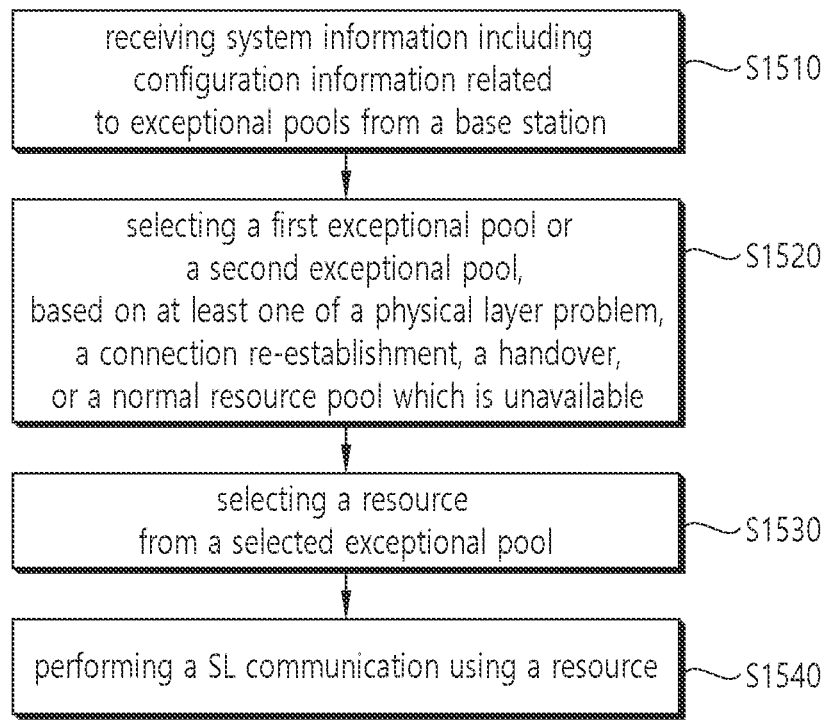
FIG. 15 shows a procedure of performing resource selection by a first apparatus.

FIG. 15 shows a procedure of performing resource selection by a first apparatus. The embodiment of FIG. 15 may be combined with various embodiments of the present disclosure.

Referring to FIG. 15, in step S1510, a first apparatus may receive system information including configuration information related to exceptional pools from a base station. For example, the exceptional pools may include a first exceptional pool including a feedback resource and a second exceptional pool not including the feedback resource. In step S1520, the first apparatus may select the first exceptional pool or the second exceptional pool, based on at least one of a physical layer problem, a connection re-establishment, a handover, or a normal resource pool which is unavailable. In step S1530, the first apparatus may select a resource from the selected exceptional pool. In step S1540, the first apparatus may perform a sidelink (SL) communication using the resource. For example, the first exceptional pool or the second exceptional pool may be selected based on quality of service (QoS) of a packet to be transmitted.

For example, the first exceptional pool may be selected based on the QoS which requires higher reliability.

For example, performing the SL communication using the resource comprising: transmitting the packet to a second apparatus; and receiving a feedback from the second apparatus.

For example, the feedback may include at least one of HARQ feedback, channel state information (CSI), or closed-loop power control parameters.

For example, the second exceptional pool may be selected based on the QoS which doesn't require reliability.

For example, performing the SL communication using the resource comprising: transmitting the packet to a second apparatus. For example, no feedback may be received from the second apparatus For example, the first exceptional pool may be selected based on at least one of a cell reselection, a beam failure, or a beam reselection.

For example, the configuration information may be configured based on a validity area, and the validity area may include at least one of a single sidelink zone, a sector, a single beam, or a set of cells.

For example, the resource may be selected based on a resource selection mechanism which includes random resource selection or short-term sensing resource selection.

Additionally, for example, the first apparatus may transmit an information, which is related to a need for an exceptional pool with higher reliability, to the base station, the exceptional pools may include an exceptional pool with higher reliability.

For example, the first exceptional pool and the second exceptional pool may be from different radio access technologies (RATs).

For example, the first exceptional pool may be from NR RAT, and the first exceptional pool may be selected based on the QoS which requires higher reliability.

Additionally, for example, the first apparatus may transmit a request for a configuration related to an exceptional pool to the base station, the configuration information may be received based on the request.

Examples described above may be applied to variable devices which will be described below. For example, a processor (102) of a first apparatus (100) may control a transceiver (106) to receive system information including configuration information related to exceptional pools from a base station (200). For example, the processor (102) of the first apparatus (100) may select the first exceptional pool or the second exceptional pool, based on at least one of a physical layer problem, a connection re-establishment, a handover, or a normal resource pool which is unavailable. For example, the processor (102) of the first apparatus (100) may select a resource from the selected exceptional pool. For example, the processor (102) of the first apparatus (100) may control the transceiver to perform a sidelink (SL) communication using the resource.

Referring to an example of this disclosure, a first apparatus for performing wireless communication may be provided. The first apparatus may comprise one or more memories storing instructions; one or more transceivers; and one or more processors connected to the one or more memories and the one or more transceivers. For example, the one or more processors may execute the instructions to: receive system information including configuration information related to exceptional pools from a base station, wherein the exceptional pools includes a first exceptional pool including a feedback resource and a second exceptional pool not including the feedback resource; select the first exceptional pool or the second exceptional pool, based on at least one of a physical layer problem, a connection re-establishment, a handover, or a normal resource pool which is unavailable; select a resource from the selected exceptional pool; and perform a sidelink (SL) communication using the resource, wherein the first exceptional pool or the second exceptional pool is selected based on quality of service (QoS) of a packet to be transmitted.

Referring to an example of this disclosure, an apparatus configured to control a first user equipment (UE) may be provided. The apparatus may comprise: one or more processors; and one or more memories operably connected to the one or more processors and storing instructions. For example, the one or more processors execute the instructions to: receive system information including configuration information related to exceptional pools from a base station, wherein the exceptional pools includes a first exceptional pool including a feedback resource and a second exceptional pool not including the feedback resource; select the first exceptional pool or the second exceptional pool, based on at least one of a physical layer problem, a connection re-establishment, a handover, or a normal resource pool which is unavailable; select a resource from the selected exceptional pool; and perform a sidelink (SL) communication using the resource, wherein the first exceptional pool or the second exceptional pool is selected based on quality of service (QoS) of a packet to be transmitted.

Referring to an example of this disclosure, a non-transitory computer-readable storage medium may be provided. The non-transitory computer-readable storage medium may store instructions that, when executed, cause a first apparatus to: receive system information including configuration information related to exceptional pools from a base station, wherein the exceptional pools includes a first exceptional pool including a feedback resource and a second exceptional pool not including the feedback resource; select the first exceptional pool or the second exceptional pool, based on at least one of a physical layer problem, a connection re-establishment, a handover, or a normal resource pool which is unavailable; select a resource from the selected exceptional pool; and perform a sidelink (SL) communication using the resource, wherein the first exceptional pool or the second exceptional pool is selected based on quality of service (QoS) of a packet to be transmitted.

FIG. 16 shows a procedure of configuring exceptional pools by a base station. The embodiment of FIG. 16 may be combined with various embodiments of the present disclosure.

Referring to FIG. 16, in step S1610, a base station may transmit system information including configuration information related to exceptional pools to a first apparatus, wherein the exceptional pools includes a first exceptional pool including a feedback resource and a second exceptional pool not including the feedback resource. For example, the first exceptional pool or the second exceptional pool may be selected, based on at least one of a physical layer problem, a connection re-establishment, a handover, or a normal resource pool which is unavailable. For example, a resource from the first exceptional pool may be selected. For example, a sidelink (SL) communication may be performed using the resource. For example, the first exceptional pool or the second exceptional pool may be selected based on quality of service (QoS) of a packet to be transmitted.

Additionally, for example, the base station may receive a request for a configuration related to an exceptional pool from the first apparatus, wherein the configuration information may be transmitted based on the request.

Examples described above may be applied to variable devices which will be described below. For example, a processor (202) of a base station (200) may control a transceiver (206) to transmit system information including configuration information related to exceptional pools to a first apparatus (100).

Referring to an example of this disclosure, a base station for performing wireless communication may be provided. The base station may comprise one or more memories storing instructions; one or more transceivers; and one or more processors connected to the one or more memories and the one or more transceivers. For example, the one or more processors may execute the instructions to: transmit system information including configuration information related to exceptional pools to a first apparatus, wherein the exceptional pools includes a first exceptional pool including a feedback resource and a second exceptional pool not including the feedback resource; wherein the first exceptional pool or the second exceptional pool is selected, based on at least one of a physical layer problem, a connection re-establishment, a handover, or a normal resource pool which is unavailable, wherein a resource from the first exceptional pool is selected, wherein a sidelink (SL) communication is performed using the resource, and wherein the first exceptional pool or the second exceptional pool is selected based on quality of service (QoS) of a packet to be transmitted.

Additionally, for example, the one or more processors further execute the instructions to: receive a request for a configuration related to an exceptional pool from the first apparatus, wherein the configuration information is transmitted based on the request.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
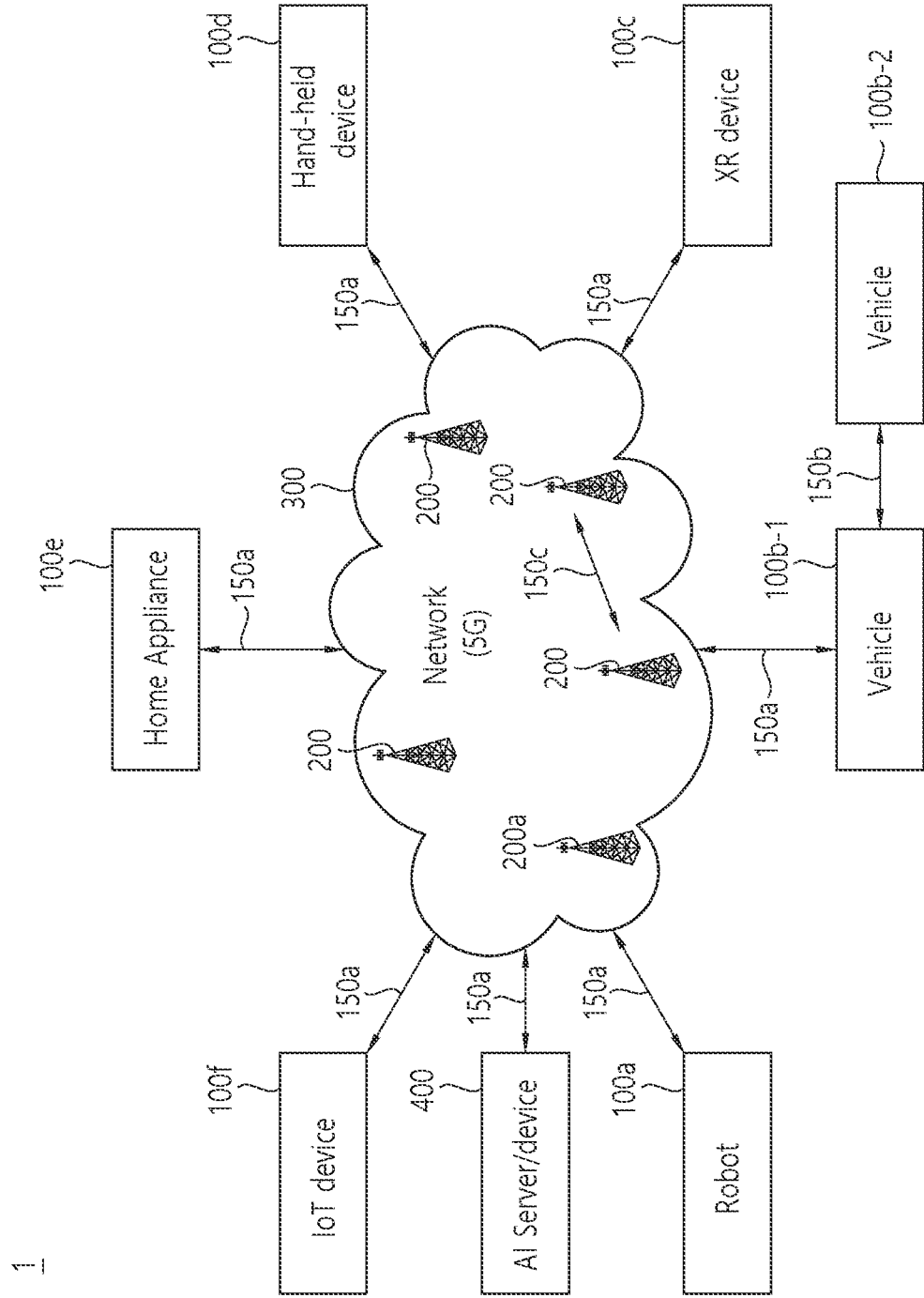
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
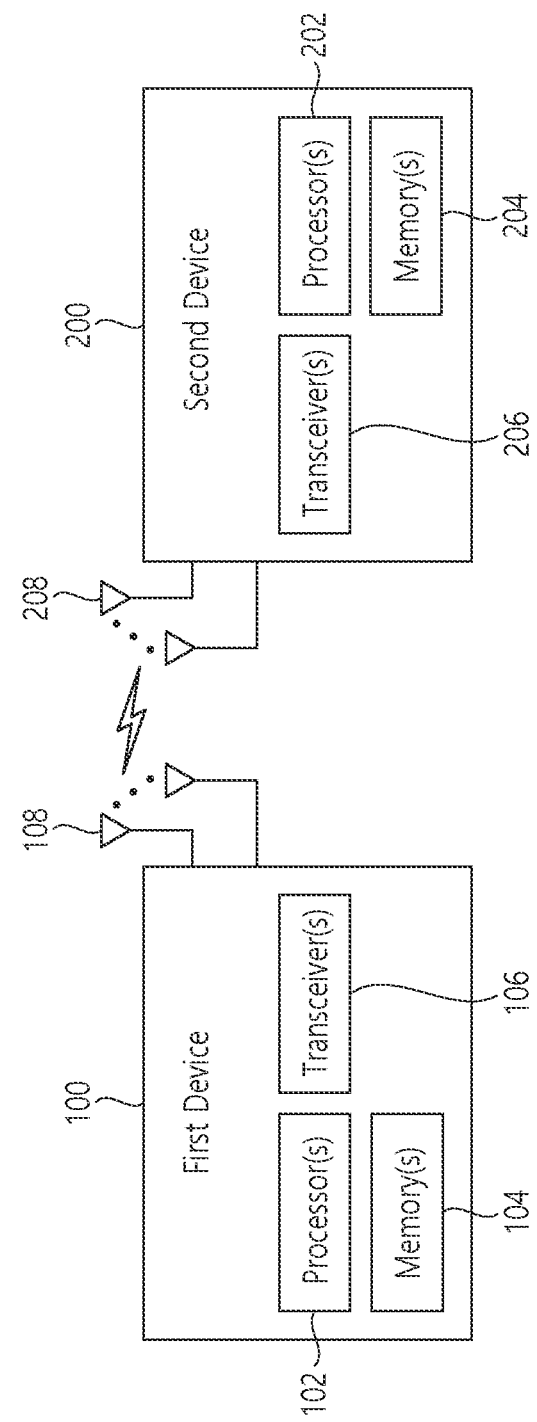
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
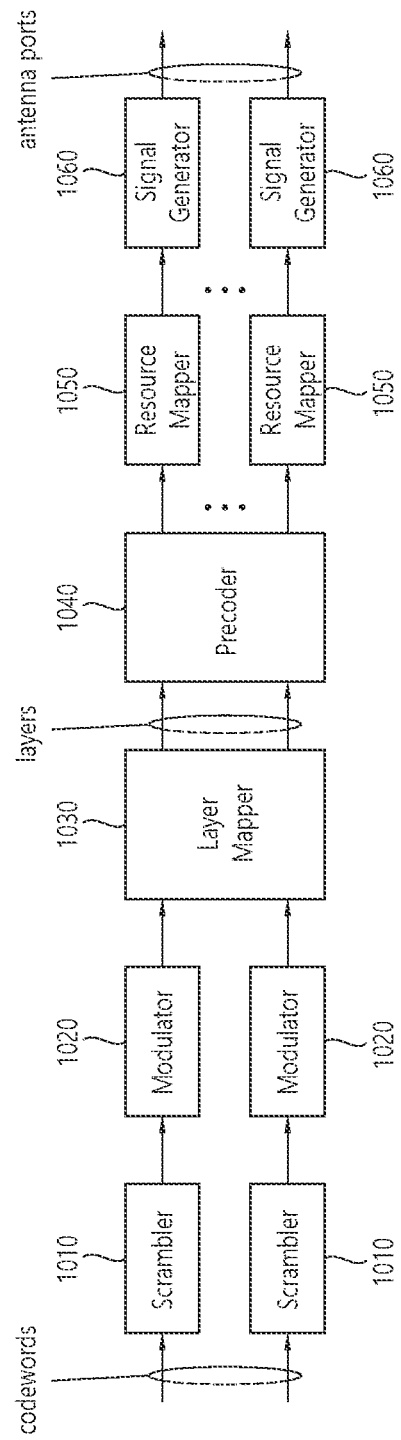
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
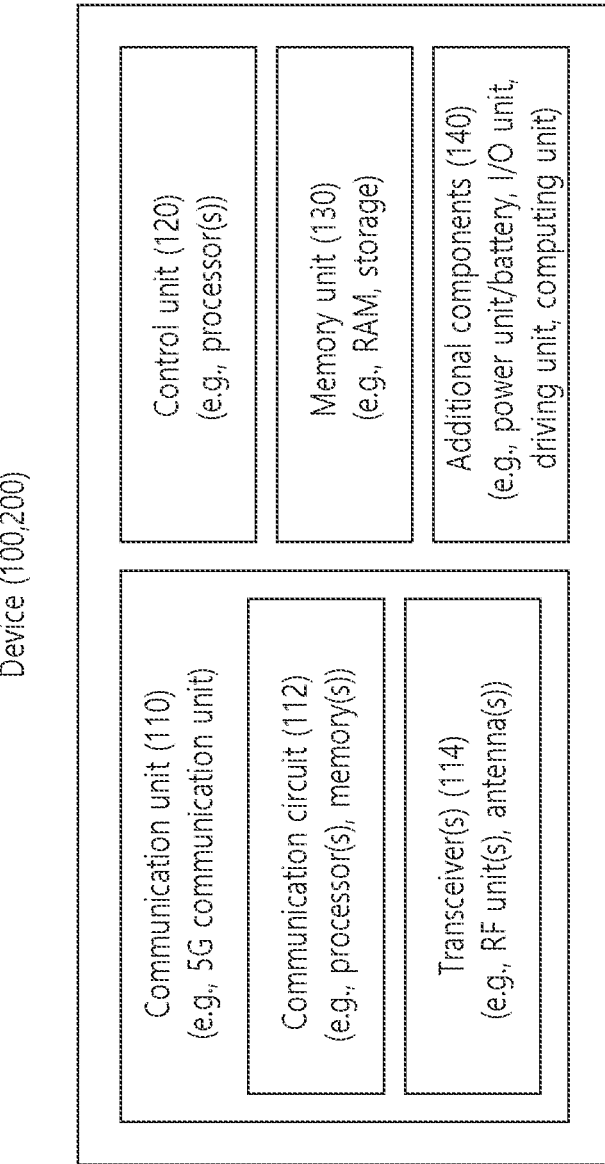
FIG. 20 shows a wireless device, in accordance with an embodiment of the present disclosure.

FIG. 20 shows another example of a wireless device, in accordance with an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
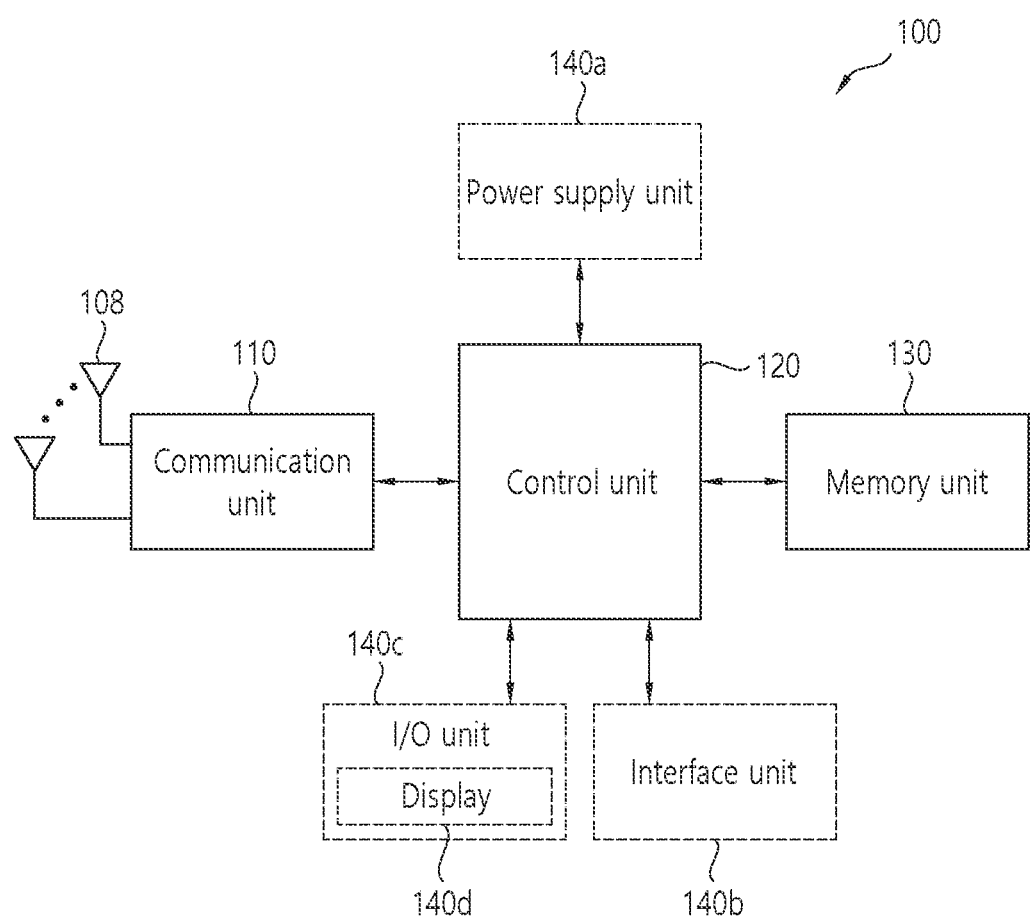
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 22 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus device, wireless communication, the method comprising:
    obtaining information related to one exceptional pool;
    determining to use the one exceptional pool, based on occurrence of an exceptional case;
    selecting a first resource from the one exceptional pool;
    transmitting, to a second device, sidelink control information (SCI) for scheduling a physical sidelink shared channel (PSSCH) through a physical sidelink control channel (PSCCH), based on the first resource;
    transmitting, to the second device, a medium access control (MAC) protocol data unit (PDU) through the PSSCH, based on the first resource; and
    receiving a first hybrid automatic repeat request (HARQ) feedback related to the MAC PDU through a physical sidelink feedback channel (PSFCH), based on a first HARQ feedback resource,
    wherein the one exceptional pool includes at least one HARQ feedback resource, for the MAC PDU in which a HARQ feedback is set to enabled, and
    wherein the one exceptional pool with no HARQ feedback resource is not allowed, for the MAC PDU in which a HARQ feedback is set to enabled.

2. The method of claim 1, wherein the exceptional case occurs based on a quality of service (QoS).

3. The method of claim 1, wherein feedback received through the PSFCH includes at least one of the first HARQ feedback, channel state information (CSI), or closed-loop power control parameters.

4. The method of claim 1, wherein the exceptional case occurs based on at least one of a physical layer problem, a connection re-establishment, a handover, or a normal resource pool which is unavailable.

5. The method of claim 1, wherein the exceptional case occurs based on at least one of a cell reselection, a beam failure, or a beam reselection.

6. The method of claim 1, wherein the information related to the one exceptional pool is configured based on a validity area, and
    wherein the validity area includes at least one of a single sidelink zone, a sector, a single beam, or a set of cells.

7. The method of claim 1,
    wherein the first resource is selected based on a resource selection mechanism which includes random resource selection or short-term sensing resource selection.

8. The method of claim 1, further comprising:
    transmitting a request for a configuration related to an exceptional pool to a base station,
    wherein the information related to the one exceptional pool is received based on the request.

9. A first device for performing wireless communication, the first device comprising:
    one or more memories storing instructions;
    one or more transceivers; and
    one or more processors connected to the one or more memories and the one or more transceivers, wherein the one or more processors execute the instructions to:
    obtain information related to one exceptional pool;
    determine to use the one exceptional pool, based on occurrence of an exceptional case;
    select a first resource from the one exceptional pool;
    transmit, to a second device, sidelink control information (SCI) for scheduling a physical sidelink shared channel (PSSCH) through a physical sidelink control channel (PSCCH), based on the first resource;
    transmit, to the second device, a medium access control (MAC) protocol data unit (PDU) through the PSSCH, based on the first resource; and
    receive a first hybrid automatic repeat request (HARQ) feedback related to the MAC PDU through a physical sidelink feedback channel (PSFCH), based on a first HARQ feedback resource,
    wherein the one exceptional pool includes at least one HARQ feedback resource, for the MAC PDU in which a HARQ feedback is set to enabled, and
    wherein the one exceptional pool with no HARQ feedback resource is not allowed, for the MAC PDU in which a HARQ feedback is set to enabled.

10. A device configured to control a first user equipment (UE), the device comprising:
    one or more processors; and
    one or more memories operably connectable to the one or more processors and storing instructions, wherein the one or more processors execute the instructions to:
    obtain information related to one exceptional pool;
    determine to use the one exceptional pool, based on occurrence of an exceptional case;
    select a first resource from the one exceptional pool;
    transmit, to a second UE, sidelink control information (SCI) for scheduling a physical sidelink shared channel (PSSCH) through a physical sidelink control channel (PSCCH), based on the first resource;
    transmit, to the second UE, a medium access control (MAC) protocol data unit (PDU) through the PSSCH, based on the first resource; and
    receive a first hybrid automatic repeat request (HARQ) feedback related to the MAC PDU through a physical sidelink feedback channel (PSFCH), based on a first HARQ feedback resource, wherein the one exceptional pool includes at least one HARQ feedback resource, for the MAC PDU in which a HARQ feedback is set to enabled, and wherein the one exceptional pool with no HARQ feedback resource is not allowed, for the MAC PDU in which a HARQ feedback is set to enabled.

* * * * *